United States Patent
Kakizoe et al.

(10) Patent No.: US 6,773,147 B2
(45) Date of Patent: Aug. 10, 2004

(54) TWIN BEAM TYPE HEADLIGHT DEVICE FOR MOTORCYCLE

(75) Inventors: Takashige Kakizoe, Hamamatsu (JP); Hisao Tsushima, Inasa-gun (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 22 days.

(21) Appl. No.: 10/334,913

(22) Filed: Jan. 2, 2003

(65) Prior Publication Data

US 2003/0133306 A1 Jul. 17, 2003

(30) Foreign Application Priority Data

Jan. 17, 2002 (JP) ........................................ 2002-008846

(51) Int. Cl.[7] ................................................ B60Q 1/16
(52) U.S. Cl. ............................ 362/475; 315/82; 315/83
(58) Field of Search ................................. 362/459, 473, 362/475, 464, 465, 487, 506, 507, 227; 315/76, 77, 82, 83

(56) References Cited

U.S. PATENT DOCUMENTS

| | | | | |
|---|---|---|---|---|
| 2,037,863 A | * | 4/1936 | Henri | 315/83 |
| 2,556,052 A | * | 6/1951 | Adler, Jr. | 362/520 |
| 3,099,400 A | * | 7/1963 | Holmes | 362/476 |
| 3,364,385 A | * | 1/1968 | Yatcko | 315/83 |
| 3,373,311 A | * | 3/1968 | Neulinger et al. | 315/83 |
| 3,671,802 A | * | 6/1972 | Ballou | 315/83 |
| 3,718,835 A | * | 2/1973 | Stoughton | 315/83 |
| 3,894,227 A | * | 7/1975 | Pitkjaan et al. | 362/543 |
| 4,105,898 A | * | 8/1978 | Farler et al. | 315/82 |
| 4,539,627 A | * | 9/1985 | Ogishima | 362/476 |
| 6,334,701 B2 | * | 1/2002 | Kodaira et al. | 362/475 |

FOREIGN PATENT DOCUMENTS

| | | |
|---|---|---|
| JP | 63-33287 Y2 | 9/1988 |
| JP | 4-262301 A | 9/1992 |

* cited by examiner

Primary Examiner—Thomas M. Sember
Assistant Examiner—Ismael Negron
(74) Attorney, Agent, or Firm—Nixon & Vanderhye, P.C.

(57) ABSTRACT

The headlight device includes: a pair of left and right headlights, the one on the right road-shoulder side being a double filament type headlight which is switchable between low and highbeams, the other one on the left, oncoming vehicle's side, being a single filament type headlight dedicated for low beam only; and a lighting control circuit which activates the low beam filaments of both headlights in the low beam mode and which activates the high beam filament of the double filament type headlight and the low beam filament of the other headlight in high beam mode.

8 Claims, 10 Drawing Sheets

Glass tube

Glass tube

For a single filament configuration

For a double filament configuration

Right side(road shoulder side) | Left side(oncoming vehicle's side)

For high beam only | For low beam only / Inside the lens frame

Single filament + single filament arrangement

Double filament + double filament arrangement

Road shoulder side
Low/high switchable
Double filament type

Oncoming vehible's side
For low-beam only
Low-beam type

Double filament + single filament arrangement

Low/high switchable

For low beam only

Double filament + single filament arrangement

TWIN BEAM TYPE HEADLIGHT DEVICE FOR MOTORCYCLE

BACKGROUND OF THE INVENTION

(1) Field of the Invention

The present invention relates to a twin beam type headlight device for a motorcycle, having a pair of headlights, arranged left and right on the front face of a cowling that covers the front part of the motorcycle.

(2) Description of the Prior Art

To begin with, the luminous intensity distribution depending on the type of a bulb(light bulb) of a headlight for motorcycles will be explained. The case described here is assumed to be applied to a right-side traffic model and a left-side traffic model may be provided by reversing the right-side left.

FIG. 1 sectionally shows a typical example of a headlight. As shown in FIG. 1, it includes a reflector (reflecting mirror) b of a headlight a having a parabolic configuration. Recently, there has been a configuration in which a cut-less, clear or transparent lens c is used for the front face with a reflector b of a multi-reflector(multi-facet reflecting plate) so that a desired luminous intensity performance can be obtained by devising the shapes and arrangement of small mirror facets. Here, reference numeral d and e in FIG. 1 designate a headlight bulb(light bulb) and headlight housing, respectively.

In riding a motorcycle, if it runs on a two-way traffic road, not on a one-way traffic road, the headlight is set at the low-beam position so that the projection of the headlight will not dazzle the drivers on oncoming vehicles. In a motorcycle having a pair of left and right headlights, in the case of right-side traffic as shown in FIG. 2, for example, it is necessary to create a right-side higher luminous intensity distribution in which only the projection of the light on the left or on the oncoming vehicle's side is set at the low beam position while the projection of the light on the right side or the opposite side is set at the high beam position. It should be noted that for a left-side traffic model, the distribution of light should be reversed right-side left.

Headlight bulbs for realizing the luminous intensity distribution as above can be roughly categorized into a double filament type shown in FIG. 3 and a single filament type shown in FIG. 4. A typical double filament type headlight bulb shown in FIG. 3 has two filaments f1 and f2 for low and high beams incorporated in a glass tube. A cup g is disposed beneath low-beam filament f1 and this cup g blocks the light emitted from the filament f1 so that light will not reach approximately the lower half of the reflector. Cup g is designed so as to meet the predetermined specification of luminous intensity distribution.

On the other hand, as shown in FIG. 4, a single filament type headlight bulb has no cup, hence light emitted from filament h is designed to reach the whole surface of the reflector. In order to attain the luminous intensity distribution as shown in FIG. 2, it is generally known that the reflectors for a single filament type and double filament type headlights should have hatched areas shown in FIGS. 5A and 5B as their reflective areas, respectively. As seen in FIGS. 5A and 5B, since in the double filament type headlight, light emitted from the low-beam filament is blocked by cup g, hatched portions A and B should be formed greater than those of a single filament type headlight. Particularly, the double filament type headlight is configured so that the distance from the center to a point H is greater than the distance from the center to a point K in the single filament type headlight.

Up to now, the luminous intensity distribution depending on the type of a headlight bulb has been described. To sum up, a double filament type headlight uses a reflector which can be switched between the high and low beam positions but needs greater reflective areas as shown by the hatching in order to satisfy the required luminous intensity distribution. A single filament type headlight uses a reflector which is dedicated for the high or lower position and can function with smaller reflective areas as shown by the hatching.

Referring next to FIGS. 6 and 7, the character lines of left and right headlights 10R and 10L will be described. FIG. 6 shows the character lines as the outline of headlights. FIGS. 7 and 8 are front and partial side views of a motorcycle. As shown in FIGS. 7 and 8, a leg shield j covering the front of an unillustrated steering head pipe is projected forwards over the front wheel. A pair of left and right cutout holes K (with their edges forming the character lines) are formed in the projected portion and a pair of left and right headlights a, a are embedded. A cover m is provided on the upper side of headlights a, a of leg shield j while a (lower edge) character line n of leg shield j is formed on the lower side of the headlights. A shield screen n' and a pair of left and right rearview mirrors o, o are provided along the upper edge of leg shield j. A front turn signal o1 is provided on the front face of each rearview mirror o. A reference numeral p designates a front wheel; p1 a front fork; q a handlebar; and r a front leg shield-rear.

As to the motorcycle's headlight, recently there has been a tendency toward twin beam type configurations in which a pair of separate lenses are arranged like 'almond shaped eyes' to create a stylish appearance or bold features. In FIG. 6, to create 'almond shaped eyes', the four vertexes $A_1(A_2)$, $B_1(B_2)$, $C_1(C_2)$ and $D_1(D_2)$ of each lens character are arranged so as to suffice the relation: distance A–B>distance C–D, and the figure becomes more like an almond shaped eye as the point D is positioned closer to the point C. Here, comparing FIGS. 5A and 5B with FIG. 6, to realize the right-side higher luminous intensity distribution(the luminous intensity distribution with the road-shoulder side higher in the right side traffic), the distance T–U of the reflector for a single filament bulb and the distance R–S of the reflector for a double filament bulb do not need to be very long.

FIG. 9 shows a configuration in which a pair of single filament type headlight reflectors are laid, on both the left and right side, over the 'almond shaped eyes' character lines (designated at k). FIG. 10 shows a configuration in which a pair of double filament type headlight reflectors are laid, on both the left and right side, over the 'almond shaped eyes' character lines. It is known from FIGS. 9 and 10, when comparing the position of each hatched portion with the character line k, the right-side headlight reflector in both the cases, has a large enough margin with respect to the character line while as to the left-side headlight reflectors for both the single filament and double filament, the hatched portion is positioned close to the character line. Particularly, in the case shown in FIG. 10, the part designated at H is located outside the almond shaped eye character line k0, which is needed so as to be stylish, hence it is impossible to achieve the required luminous intensity distribution if no countermeasure is taken.

To deal with this, the character line has to be spread outwards as indicated by k1 in FIG. 10. However, the lower right point D1 of the reflector also displaces outward, or downwards and rightwards, so that the boldness of almond shaped eyes is lessened.

However, as shown in FIGS. 9 and 10, in the prior art in which a pair of single filament type headlights are arranged on both the left and right sides, the headlight on the left side (oncoming vehicle's side) should be allotted for that for low beam only while the headlight on the right side(road-shoulder side) should be allotted for that for high beam only, whereby only the left side low-beam only head light is activated in low-beam running, and the left side low-beam only head light and the right side high-beam only head light are both activated in high-beam running. Illustratively, when this motorcycle meets other vehicles running in the opposite direction, it should run in the normal travel mode or low-beam mode. Accordingly, only the left headlight for low-beam only is turned on. That is, there is a demand that both lights be lit up in order to improve visibility and improved appearance, but there has been no solution to meet this demand.

It is possible for the headlight configuration shown in FIG. 10 to turn both lights on during low-beam running, but the character line should be spread outwards in order to achieve the requirement of the luminous intensity distribution in the low-beam mode as mentioned above, which makes the almond shaped eye fat, lessening the bold appearance.

SUMMARY OF THE INVENTION

The present invention has been devised in order to solve the above problems, it is therefore an object of the present invention to provide a twin beam type headlight device for motorcycle, with which two lights can be turned on in the low-beam lighting mode so as to improve the visibility from the front and which can reduce the lights in diameter and hence reduce the area of the front projection of the cowling.

In order to achieve the above object, the present invention is configured as follows:

In accordance with the first aspect of the present invention, a twin beam type headlight device for a motorcycle, having a cowling that covers the front part of the body and a pair of headlights arranged side by side on the left and right sides on the front panel of the cowling, is characterized in that one of the paired headlights is a double filament type headlight which is switchable between low and high beams; the other is a single filament type headlight dedicated for low beam only; and a lighting controller which activates the low beam filaments of both headlights in the low beam mode and which activates the high beam filament of the double filament type headlight and the low beam filament of the other headlight in high beam mode is provided.

In accordance with the second aspect of the present invention, the twin beam type headlight device for a motorcycle having the above first feature is characterized in that the lens openings of the twin beam headlights are formed in an approximately elliptic shape that has major and minor axes or having an approximately parallelogram shape.

In accordance with the third aspect of the present invention, the twin beam type headlight device for a motorcycle having the above first feature is characterized in that the left and right headlights are laid out with their major axes inclined upwards and sidewards from the central axis of the vehicle, forming a roughly open-V shaped arrangement and each headlight has an optical element for achieving the predetermined luminous intensity distribution.

In accordance with the fourth aspect of the present invention, the twin beam type headlight device for a motorcycle having the above second feature is characterized in that the left and right headlights are laid out with their major axes inclined upwards and sidewards from the central axis of the vehicle, forming a roughly open-V shaped arrangement and each headlight has an optical element for achieving the predetermined luminous intensity distribution.

In accordance with the fifth aspect of the present invention, the twin beam type headlight device for a motorcycle having the above first feature is characterized in that on the assumption that the motorcycle travels on a two-way traffic road, a headlight including a double filament type bulb which is switchable between the low and high beams is arranged on the road-shoulder side, and a headlight for low beam including a single filament type headlight dedicated for low beam only is arranged on the center line side of the road.

In accordance with the sixth aspect of the present invention, the twin beam type headlight device for a motorcycle having the above second feature is characterized in that on the assumption that the motorcycle travels on a two-way traffic road, a headlight including a double filament type bulb which is switchable between the low and high beams is arranged on the road-shoulder side, and a headlight for low beam including a single filament type headlight dedicated for low beam only is arranged on the center line side of the road.

In accordance with the seventh aspect of the present invention, the twin beam type headlight device for a motorcycle having the above third feature is characterized in that on the assumption that the motorcycle travels on a two-way traffic road, a headlight including a double filament type bulb which is switchable between the low and high beams is arranged on the road-shoulder side, and a headlight for low beam including a single filament type headlight dedicated for low beam only is arranged on the center line side of the road.

In accordance with the eighth aspect of the present invention, the twin beam type headlight device for a motorcycle having the above fourth feature is characterized in that on the assumption that the motorcycle travels on a two-way traffic road, a headlight including a double filament type bulb which is switchable between the low and high beams is arranged on the road-shoulder side, and a headlight for low beam including a single filament type headlight dedicated for low beam only is arranged on the center line side of the road.

DESCRIPTION OF THE PREFERRED EMBODIMENTS

The embodiment of the present invention will hereinafter be described in detail with reference to the accompanying drawings.

Figure 11:
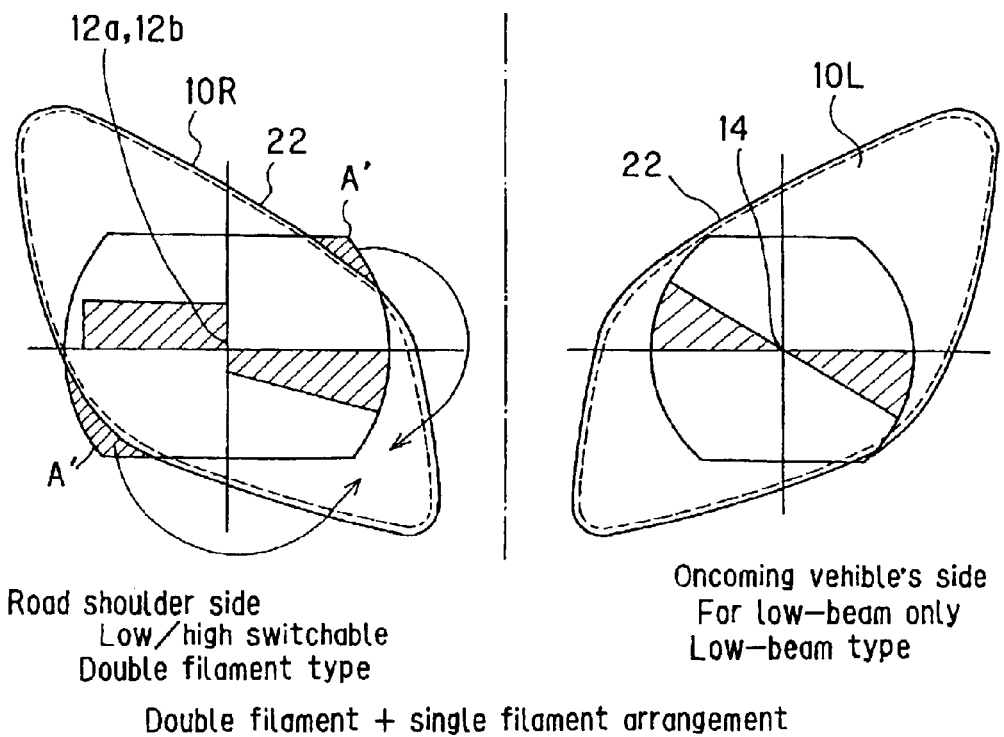
FIG. 11 is a front illustrative view showing a headlamp device in accordance with the embodiment of the present invention.
Figure 12:
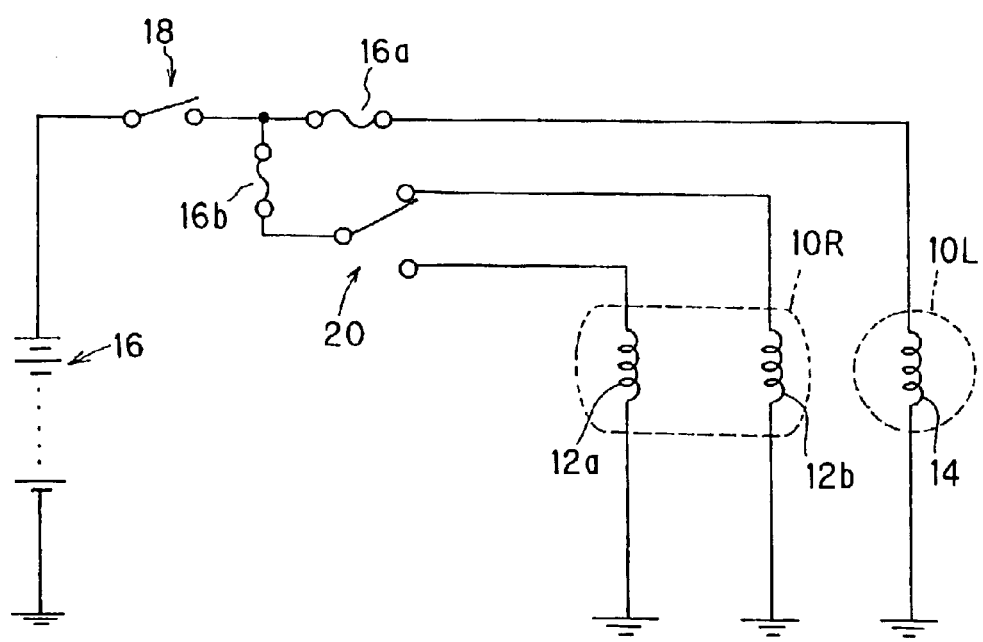
FIG. 12 is an illustrative diagram showing a circuit for lighting the filaments of the headlamp device; and, FIG. 13 is an illustrative view showing the reflectors of the headlamp device of the embodiment.

FIG. 11 is a front view showing the character lines of headlights in accordance with the embodiment, and FIG. 12 is a circuit diagram for the headlights. The leg shield of the motorcycle has the same structure as shown in FIGS. 7 and 8, so the description is omitted.

Figure 7:
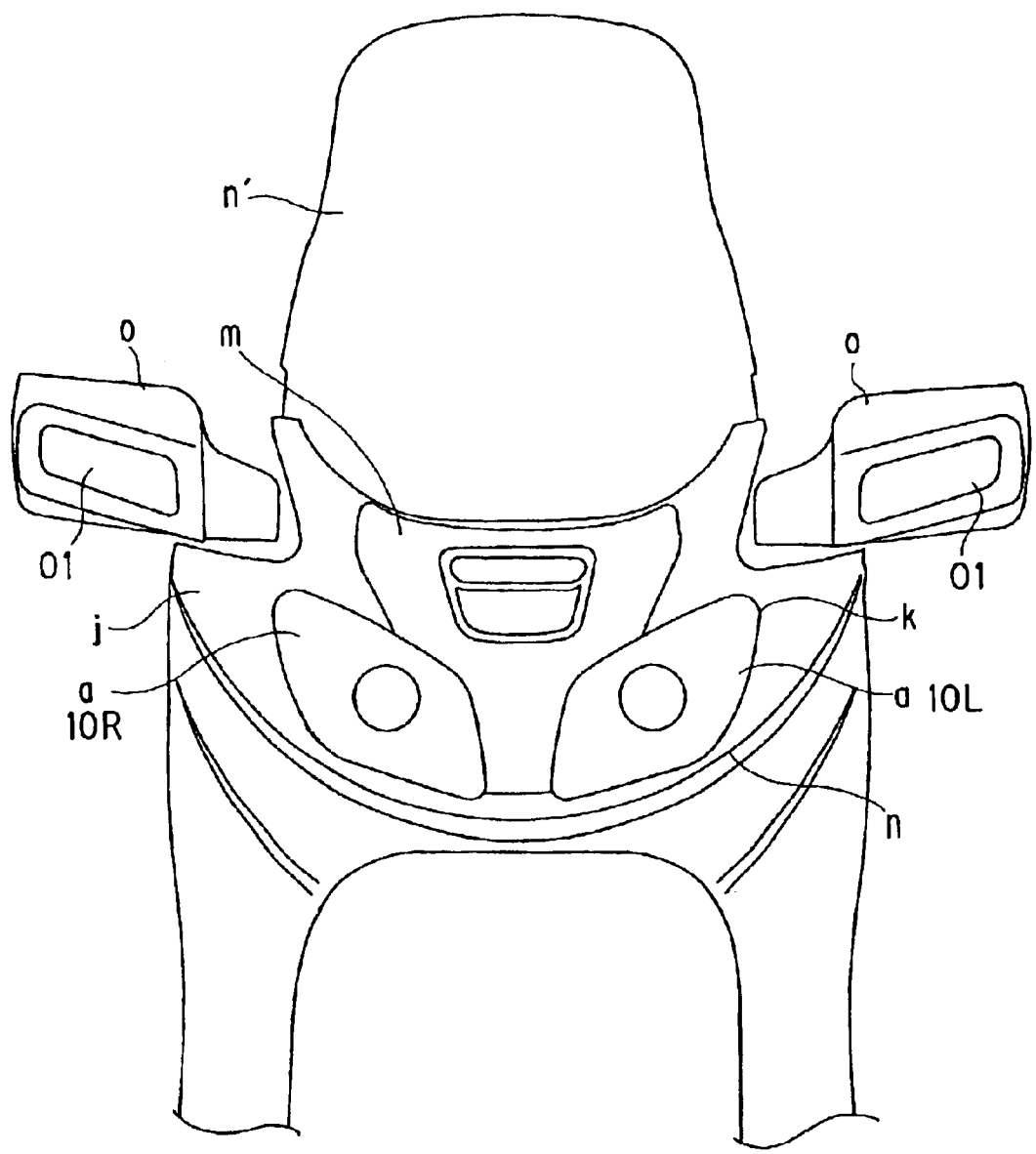
FIG. 7 is a front illustrative view showing a motorcycle.
Figure 8:
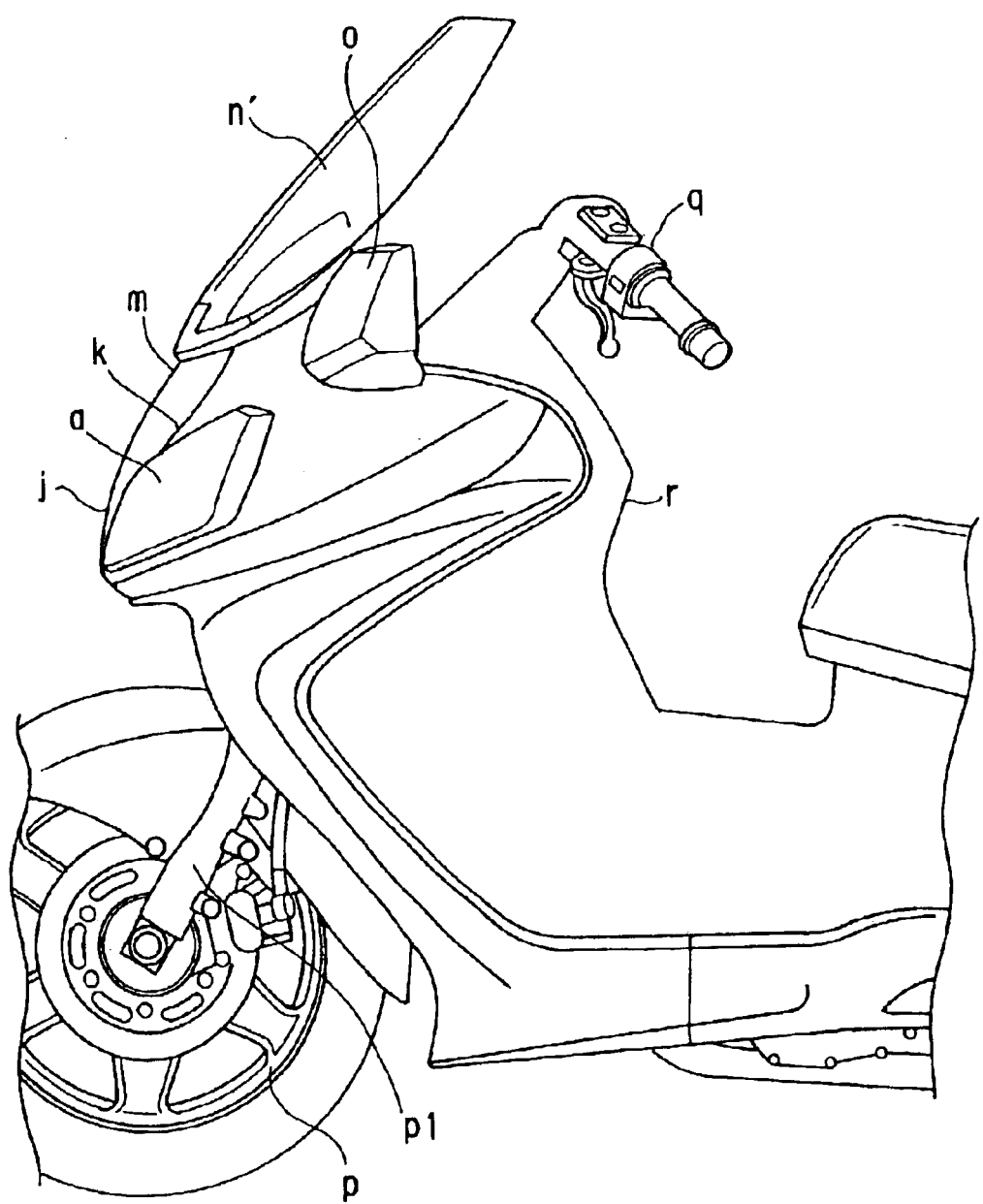
FIG. 8 is a side illustrative view partially showing a motorcycle.
Figure 9:
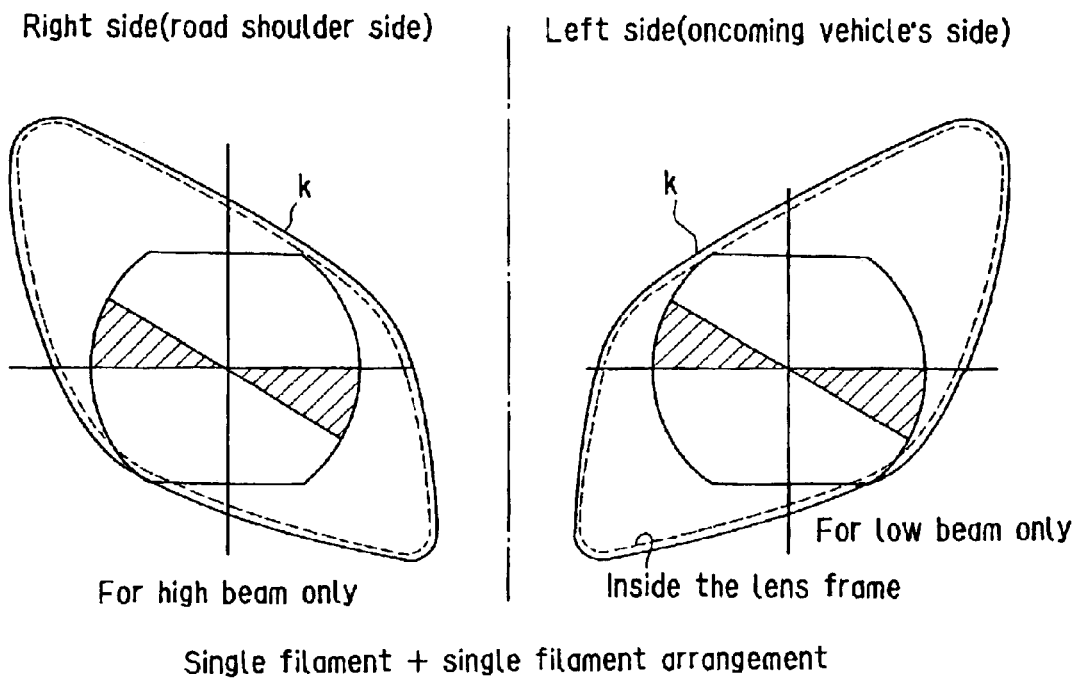
FIG. 9 is an illustrative view showing a configuration in which reflectors for single filament bulbs are provided for both the left and right character lines.
Figure 10:
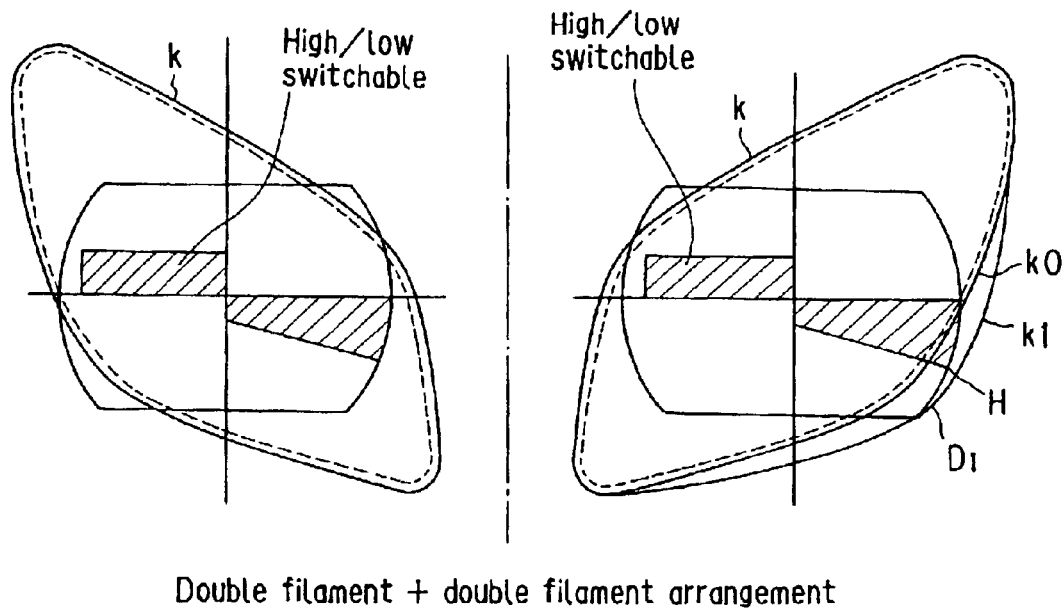
FIG. 10 is an illustrative view showing a configuration in which reflectors for double filament bulbs are provided for both the left and right character lines.

The embodiment of the present invention is applied to a twin beam type headlight device for a motorcycle having a cowling that covers the front part of the body, as shown in FIGS. 7 and 8, and a pair of headlights 10R and 10L, arranged side by side on the left and right sides on the front panel of the cowling. In the motorcycle of this embodiment, the right and left headlights 10R and 10L are adjusted for right-side traffic.

Figure 1:
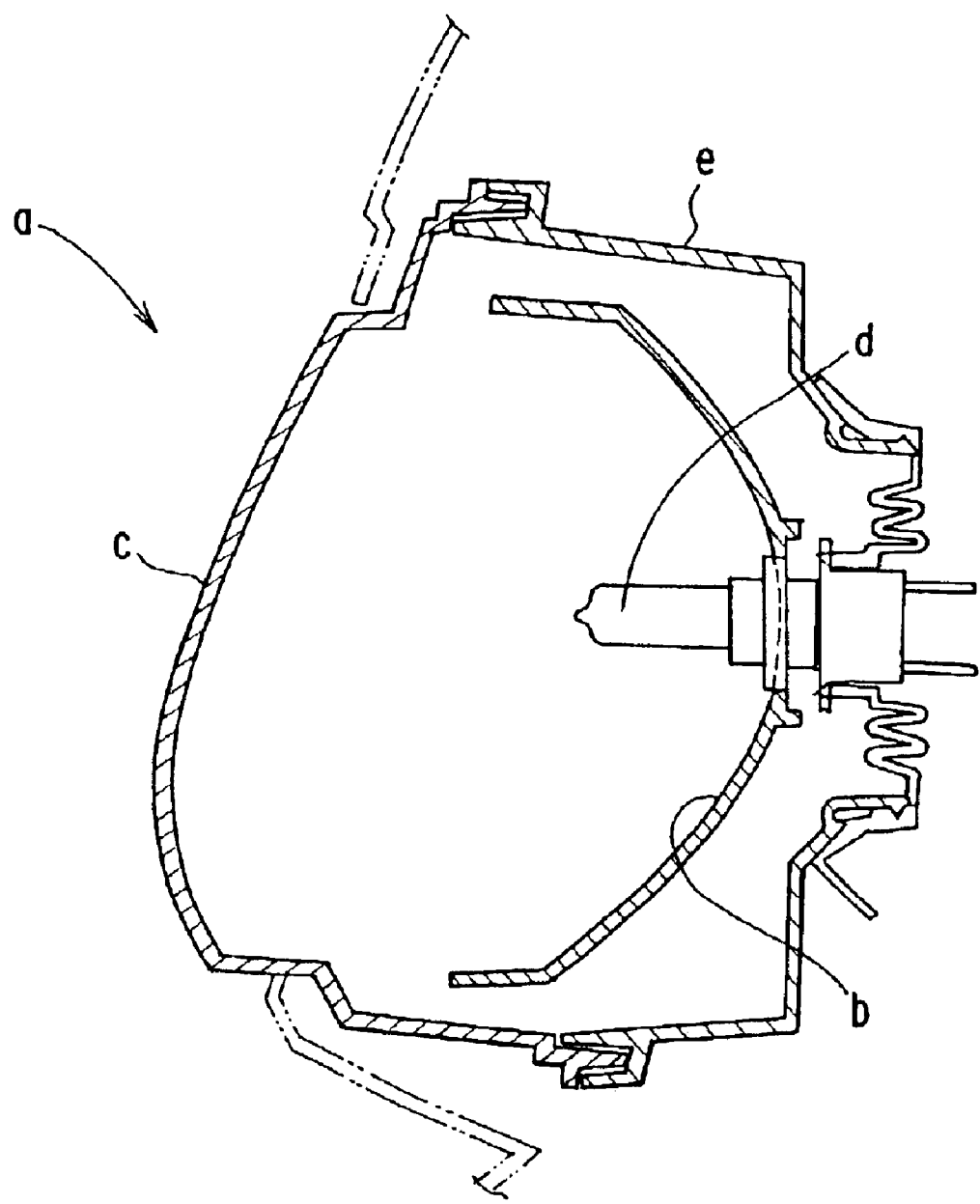
FIG. 1 is a sectional view showing a typical example of a headlight.
Figure 2:
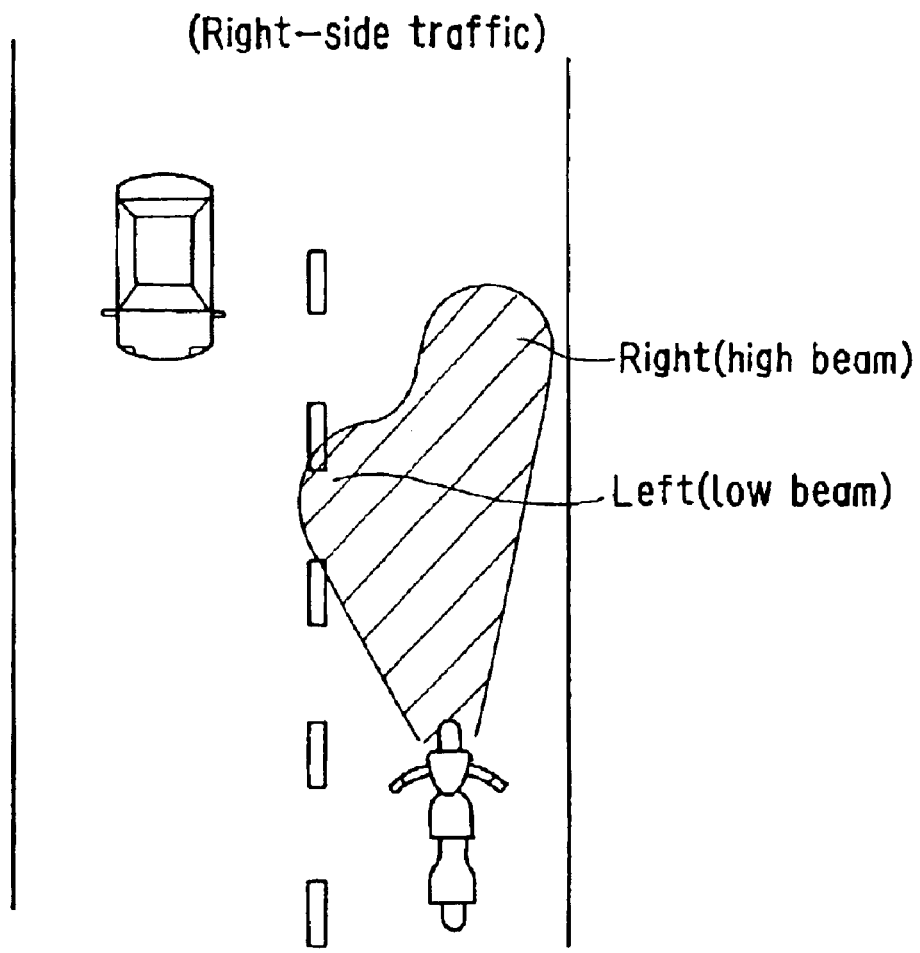
FIG. 2 is an illustrative view showing a required luminous intensity distribution for right-side traffic.
Figure 3:
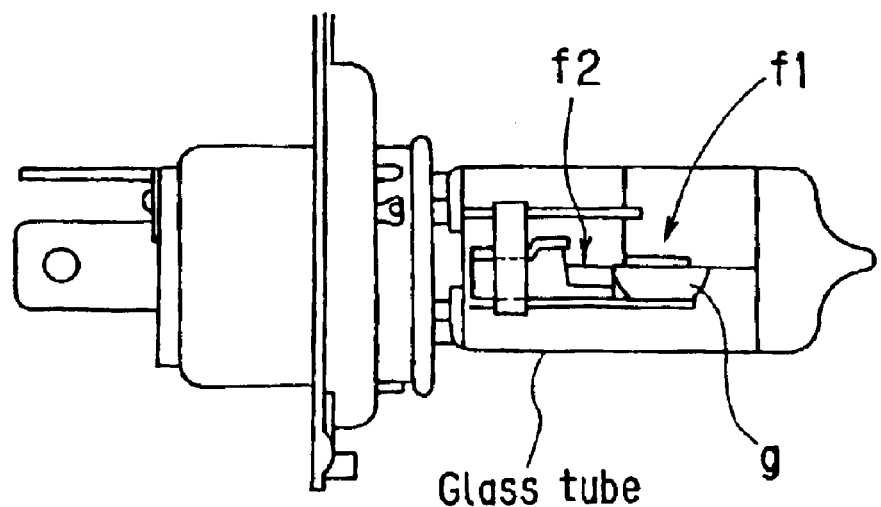
FIG. 3 is an illustrative view showing a double filament type bulb.
Figure 4:
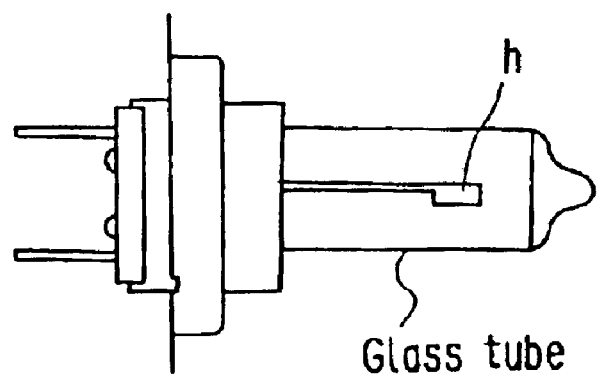
FIG. 4 is an illustrative view showing a single filament type bulb.
Figure 5A:
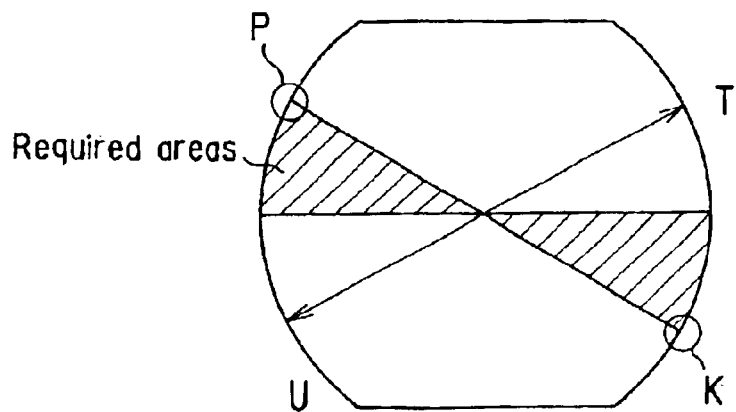
FIG. 5A is an illustrative view of a reflector for a single filament type.
Figure 5B:
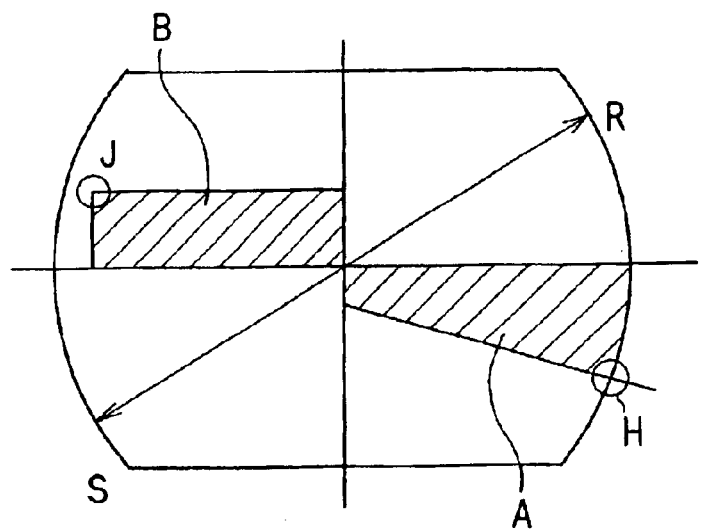
FIG. 5B is an illustrative view of a reflector for a double filament type.

As shown in FIG. 12, the device of the embodiment includes: a double filament type bulb (e.g., one shown in FIG. 3) which is switchable between low and high beams as the one on the right road-shoulder side (10R); a single filament type bulb for low beam only (e.g., one shown in FIG. 4) as the other one on the left, oncoming vehicle's side (10L); and a lighting control circuit which activates low beam filaments 12a and 14 of both headlights 10R and 10L in the low beam mode and which activates a high beam filament 12b of headlight 10R and low beam filament 14 of the other headlight 10L in the high beam mode.

In the circuit shown in FIG. 12, the voltage from a battery 16 is applied across bulb filament 14 and across bulb filament 12a or 12b, via fuses 16a and 16b, respectively when a headlamp switch 18 is turned on. In this case, when the switch 18 is turned on, filament 14 of the single filament type bulb is lit via fuse 16a while a current is applied to either filament 12a or 12b through a high-beam/low-beam changeover switch 20 so as to light one of them.

In the twin type headlight device, a pair of lens openings each having an approximately elliptic shape that has major and minor axes or having an approximately parallelogram shape are arranged as shown in FIG. 11.

The left and right headlights are laid out with their major axes inclined upwards and sidewards from the central axis of the vehicle, forming a roughly open-V shaped arrangement. Further, each headlight has an optical element (reflector or lens) for achieving the predetermined luminous intensity distribution.

Figure 6:
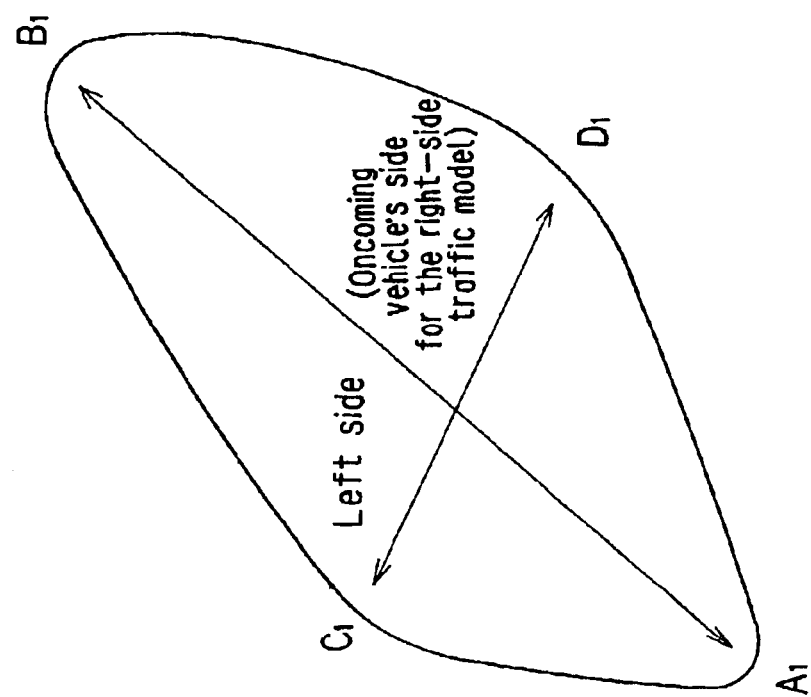
FIG. 6 is an illustrative showing character lines of head lights.
Figure 6:
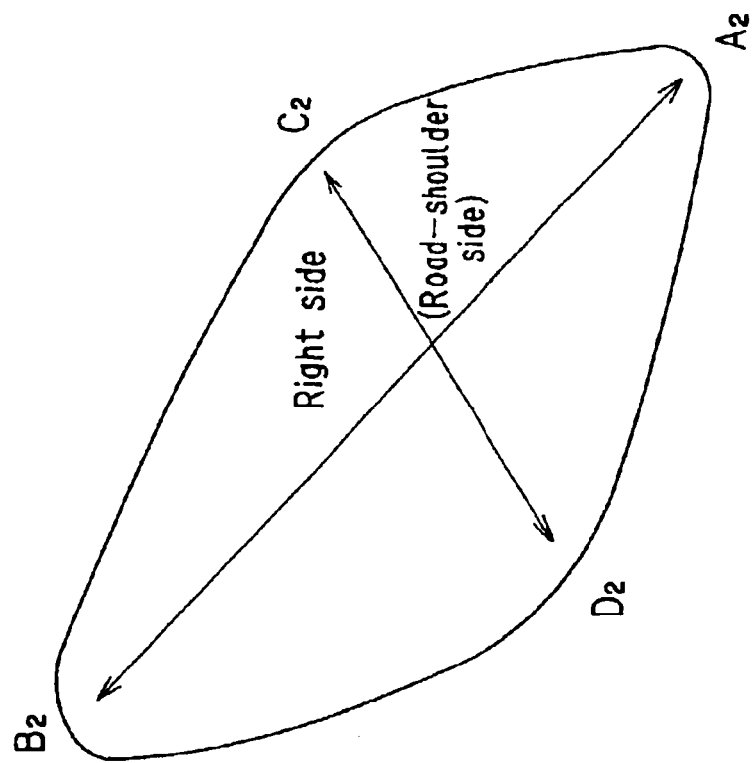

In this case, since the distance A2–B2 shown in FIG. 6 is long in the right almond shaped eye headlight 10R, the diagonal distance J–H of the double filament type headlight can be fitted with a large enough margin. On the other hand, in the left almond eye shaped headlight 10L, the distance C1–D1 is short, but the distance K–P of the single filament type headlight is shorter than the distance J–H of the double filament type headlight, so the headlight can be fitted.

With the above lighting system of the headlight device, in the low-beam travel mode, the low-beam filament 14 of the left side headlight 10L and the low-beam filament 12a of the right side headlight 10R are activated. That is, both lights are lit at their low-beam positions.

In the high-beam travel mode, the low-beam filament 14 of the left side headlight 10L and the high-beam filament 12b of the right side headlight 10R are activated. That is, also in this case both lights are lit at different, low-beam and high-beam positions.

The reflectors shown in FIG. 11 are formed so that circles with 150 mm and 120 mm in diameter are cut at the top and bottom so as to be 100 mm high. These areas are roughly the minimum sizes that can satisfy the aforementioned required luminous intensity distribution. However, the hatched portions essentially have to reside marginally inside the interior side (shown by the broken line) of lens character line 22 because the reflectors will be moved relative the lenses when aiming adjustment is made.

Figure 13:
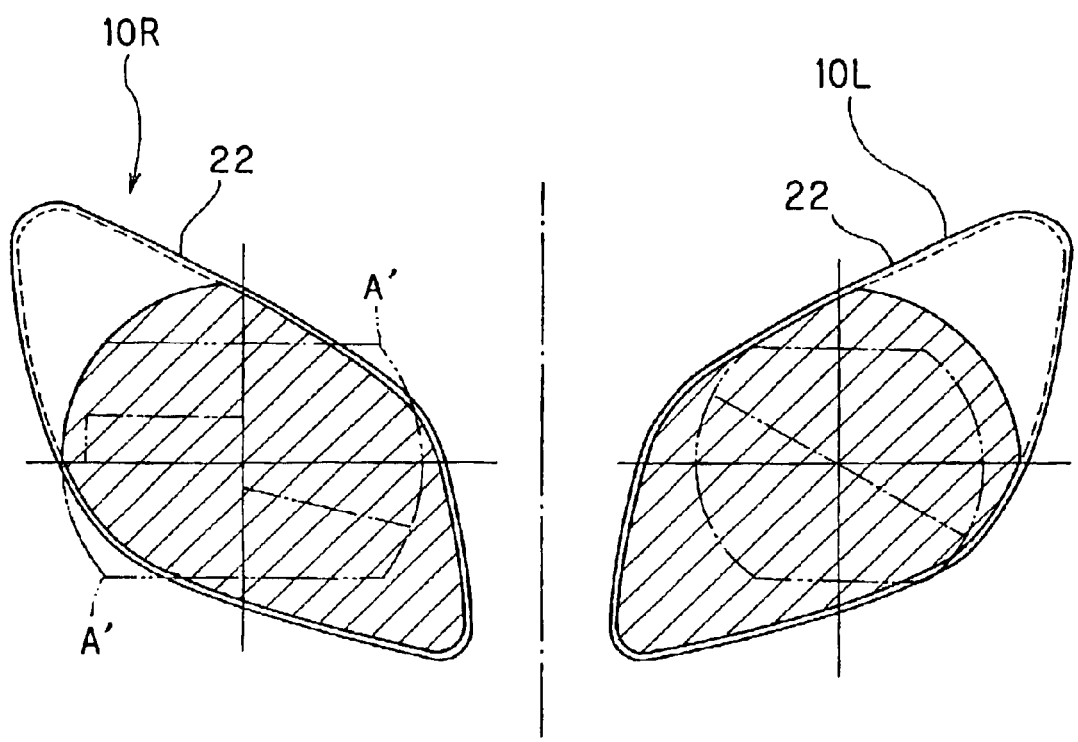

In the right side reflector shown in FIG. 11, the A' portions (densely hatched portion) are located outside the almond shaped eye character line, but the loss of light can be made up for by the other part of the reflector. The actual reflectors are formed by the hatched areas shown in FIG. 13.

Though description of the above embodiment was made taking an example of a motorcycle for right-side traffic, for a left-side traffic configuration, the left and right, the oncoming vehicle's side and the road-shoulder side, should be reversed.

Further, in the above embodiment, description was made taking an example of multi-reflector type headlights which adjust the luminous intensity distribution with reflectors, but lens-cut type headlights which adjust the luminous intensity distribution with a lens cut can be applied to the headlamp device of the present invention.

Since the present invention is thus configured as described heretofore, the following effects can be obtained.

In comparison with the twin beam type headlight device used in conventional motorcycles where one light dedicated for low beam use only and one light dedicated for high beam use only are arranged side by side on the left and right and only the low beam light is turned on in the low-beam activated mode, both lights are turned on in the configuration of the present invention, therefore, the visibility from the front is improved.

Since two lights are turned on in the low-beam activated mode, the diameter of the light dedicated for low-beam use only can be made small compared to the conventional configuration where only one light is turned on. Therefore, the cowling can be reduced as to the area of the front projection and hence made small, so that it is possible to improve the aerodynamic performance of the cowling.

When, in the above twin beam type headlight, the lens openings are formed in an approximately elliptic shape having major and minor axes or in an approximately parallelogram shape, the diameter of the headlight can be made compact compared to the arrangement where low-beam/high-beam switchable headlight is arranged on the road's center-line side of the vehicle.

What is claimed is:

1. A twin beam type headlight device for a motorcycle, having a cowling that covers the front part of the body and a pair of headlights arranged side by side on the left and right sides on the front panel of the cowling, characterized in that one of the paired headlights is a double filament type headlight which is switchable between low and high beams; the other is a single filament type headlight dedicated for low beam only; and a lighting controller which activates the low beam filaments of both headlights in the low beam mode and which activates the high beam filament of the double filament type headlight and the low beam filament of the other headlight in high beam mode is provided.

2. The twin beam type headlight device for a motorcycle according to claim 1, wherein on the assumption that the motorcycle travels on a two-way traffic road, a headlight including a double filament type bulb which is switchable between the low and high beams is arranged on the road-shoulder side, and a headlight for low beam including a single filament type headlight dedicated for low beam only is arranged on the center line side of the road.

3. The twin beam type headlight device for a motorcycle according to claim 1, wherein the left and right headlights are laid out with their major axes inclined upwards and sidewards from the central axis of the vehicle, forming a roughly open-V shaped arrangement and each headlight has an optical element for achieving the predetermined luminous intensity distribution.

4. The twin beam type headlight device for a motorcycle according to claim 3, wherein on the assumption that the motorcycle travels on a two-way traffic road, a headlight including a double filament type bulb which is switchable between the low and high beams is arranged on the road-shoulder side, and a headlight for low beam including a single filament type headlight dedicated for low beam only is arranged on the center line side of the road.

5. The twin beam type headlight device for a motorcycle according to claim 1, wherein the lens openings of the twin beam headlights are formed in an approximately elliptic shape that has major and minor axes or having an approximately parallelogram shape.

6. The twin beam type headlight device for a motorcycle according to claim 5, wherein on the assumption that the motorcycle travels on a two-way traffic road, a headlight including a double filament type bulb which is switchable between the low and high beams is arranged on the road-shoulder side, and a headlight for low beam including a single filament type headlight dedicated for low beam only is arranged on the center line side of the road.

7. The twin beam type headlight device for a motorcycle according to claim 5, wherein the left and right headlights are laid out with their major axes inclined upwards and sidewards from the central axis of the vehicle, forming a roughly open-V shaped arrangement and each headlight has an optical element for achieving the predetermined luminous intensity distribution.

8. The twin beam type headlight device for a motorcycle according to claim 7, wherein on the assumption that the motorcycle travels on a two-way traffic road, a headlight including a double filament type bulb which is switchable between the low and high beams is arranged on the road-shoulder side, and a headlight for low beam including a single filament type headlight dedicated for low beam only is arranged on the center line side of the road.

\* \* \* \* \*